United States Patent [19]
Heule

[11] Patent Number: 5,135,338
[45] Date of Patent: Aug. 4, 1992

[54] DEBURRING TOOL WITH TILT BLADE

[76] Inventor: Heinrich Heule, Kristallstrasse 6, Au, Switzerland, 6434

[21] Appl. No.: 670,046

[22] Filed: Mar. 15, 1991

[30] Foreign Application Priority Data

Mar. 16, 1990 [DE] Fed. Rep. of Germany ....... 4008533

[51] Int. Cl.$^5$ ............................................. B23B 51/00
[52] U.S. Cl. ..................................... 408/187; 408/714
[58] Field of Search ...................... 408/81, 93, 94, 146, 408/154, 155, 156, 180, 159, 714, 187, 188; 407/8, 9

[56] References Cited

U.S. PATENT DOCUMENTS

| | | | |
|---|---|---|---|
| 1,761,804 | 6/1930 | Snyder | 408/180 |
| 2,364,293 | 12/1944 | Hotchner | 408/155 |
| 2,620,689 | 12/1952 | Cogsdill | 408/187 |
| 2,878,696 | 3/1959 | Busch | 408/154 |
| 2,895,356 | 7/1959 | Cogsdill | 408/714 |
| 3,008,360 | 11/1961 | Winberry, Jr. | 408/159 |
| 3,132,543 | 5/1964 | Cogsdill | 408/187 |

FOREIGN PATENT DOCUMENTS

| | | | |
|---|---|---|---|
| 931024 | 6/1955 | Fed. Rep. of Germany . | |
| 2525872 | 12/1976 | Fed. Rep. of Germany | 408/154 |
| 236272 | 6/1986 | German Democratic Rep. . | |
| 8001 | 1/1982 | Japan | 408/156 |
| 185309 | 7/1990 | Japan | 408/81 |

Primary Examiner—Daniel W. Howell
Attorney, Agent, or Firm—Brown, Martin, Haller & McClain

[57] ABSTRACT

Described is a deburring tool with tilt blade for deburring bore edges whereby the tilt blade swings into the tool holder in a vertical direction when travelling through the bore. It features a locking device designed as bar spring which engages in a curvelike recess at the outer periphery of the deburring blade or blade holder, whereby the deburring blade holder are arranged on a tilt bolt on the basic body.

19 Claims, 6 Drawing Sheets

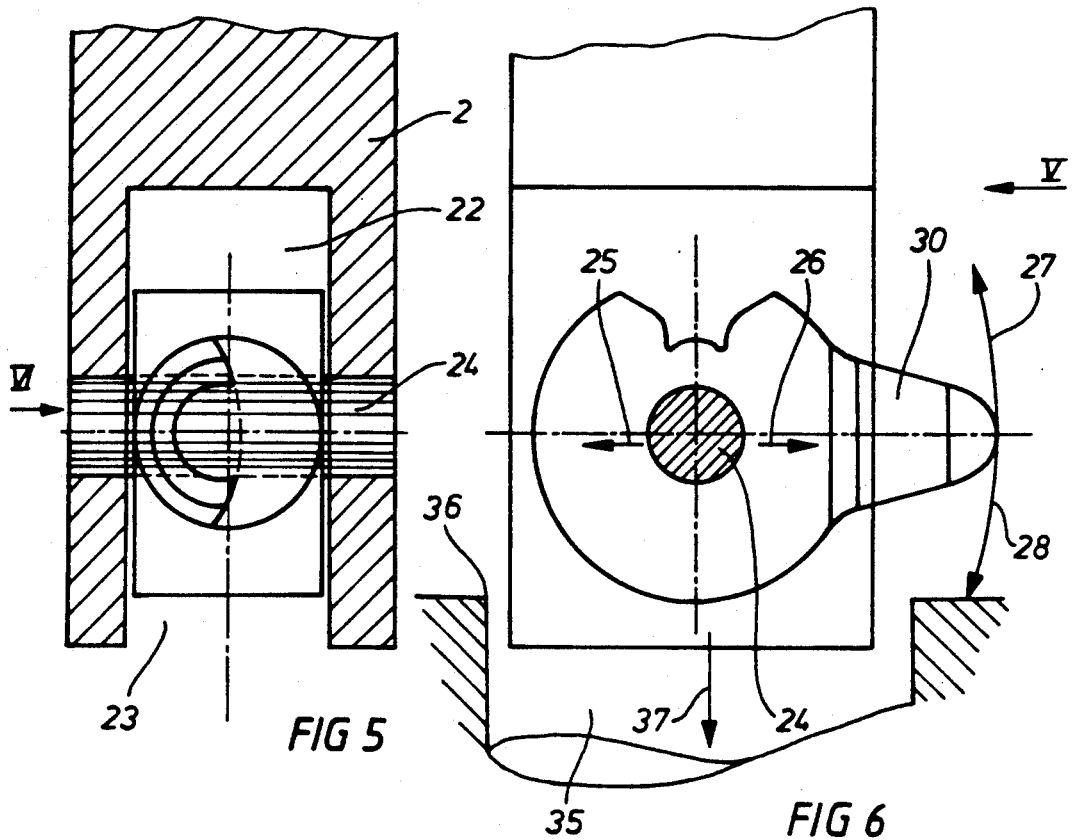
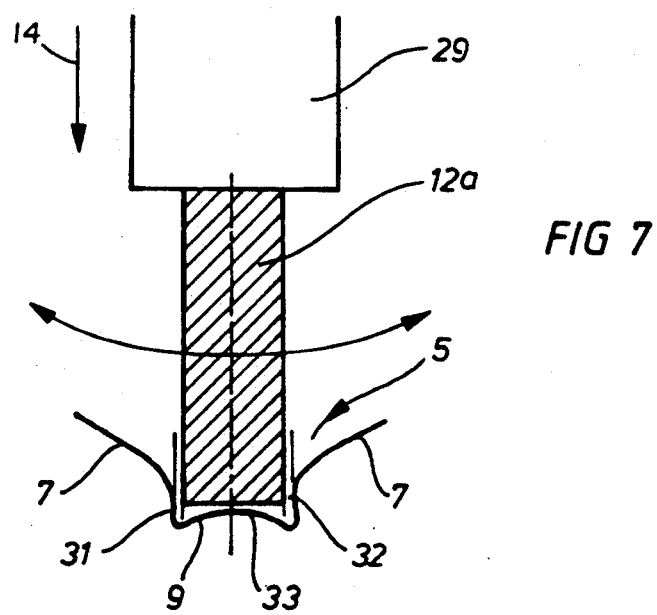

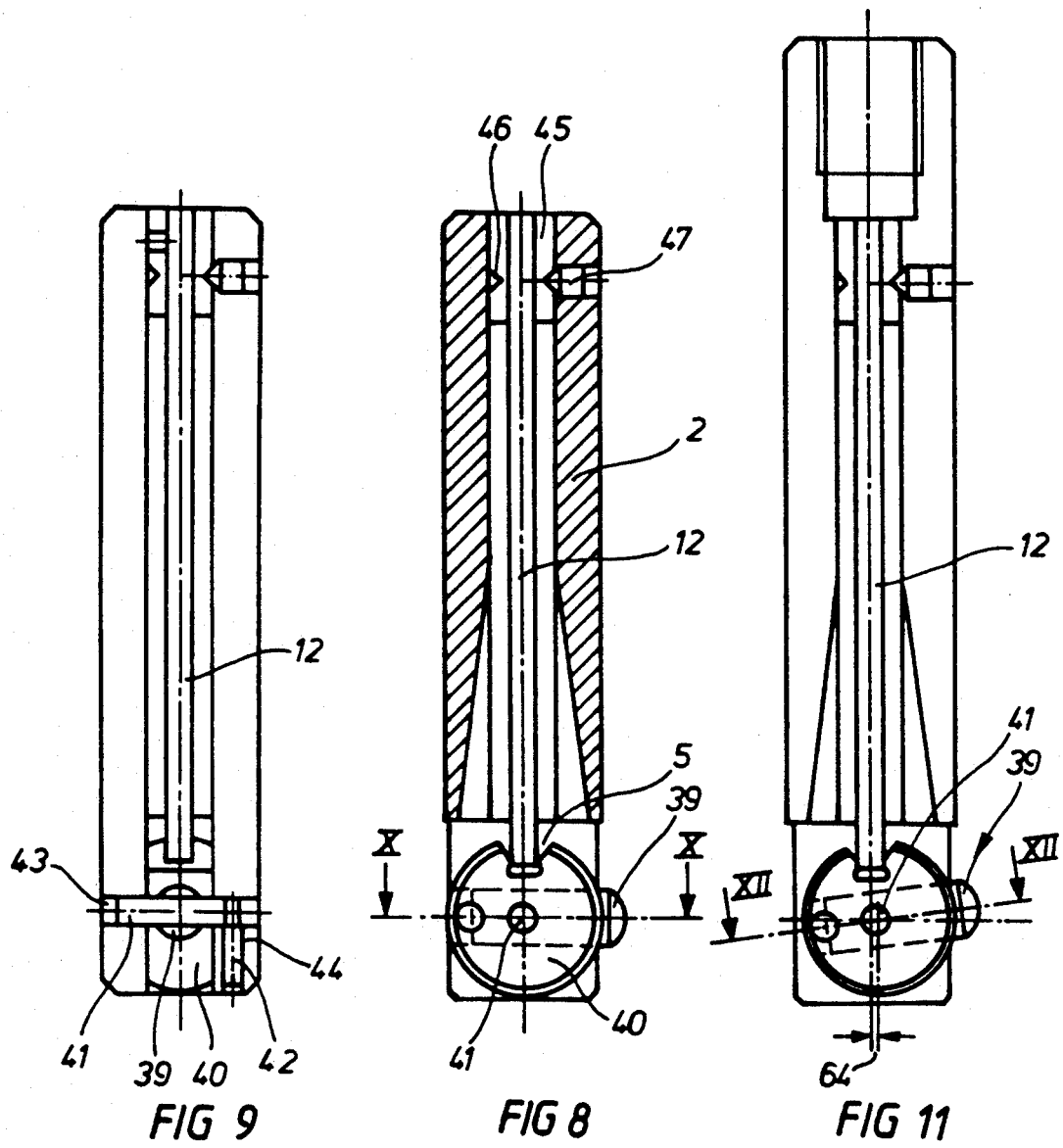
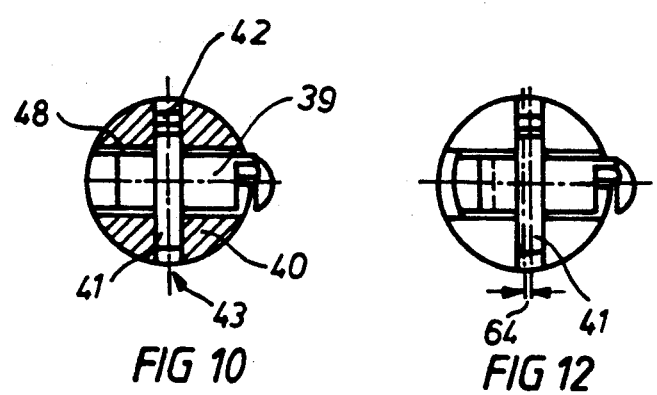

DEBURRING TOOL WITH TILT BLADE

The present invention relates generally to deburring tools, and is particularly concerned with a deburring device with tilt blade for the deburring of bore edges with straight or non-circular form.

A similar deburring device with tilt blade is described in DE-PS 931 024 whereby the tilt blade is controlled with a tappet-like retaining slot. This control of the tilt blade however is relatively cumbersome; in addition, the retaining slot is not suitable to deburr non-circular bore edges sensitively under consideration of a certain angle of traverse of the tilt blade.

Another deburring tool with tilt blade is described in U.S. Pat. No. 3,008,360, in which it is tilted over a pin which engages in the cutting blade. However this control of the tilt blade is also relatively cumbersome with the risk of premature wear in the area of the retaining slot.

Another deburring tool of the same type is described in DD 236 272 whereby the tilt blade is tilted along cams of a rotatable sleeve. Once again, relatively significant phenomena of wear occur at the cam.

Purpose of this invention therefore is to design a deburring tool with tilt blade so that the tilt blade can readily be tilted with insignificant phenomena of wear, and that the tilt blade exercises a certain small field of traverse in the area of its movement so that even noncircular bore edges can be machined.

According to the present invention, a deburring tool is provided which comprises an elongate tool holder rotatable about its longitudinal axis and having a mounting recess extending transverse to the longitudinal axis, and at least one deburring blade mounted in the mounting recess with its outer end projecting outwardly from the recess. The blade is pivotally mounted in the recess to allow the blade to tilt in opposite directions from a central deburring position to retracted, tilted positions. The blade has a hemispherical, non-cutting surface at its outer end and opposite cutting surfaces extending inwardly from the hemispherical surface. A biassing device acts on the deburring blade to bias it and provide a strong counter-pressure in any deburring position within a limited range. The blade is allowed to tilt inwardly beyond the limited deburring range when the counter-pressure of the biassing device is exceeded.

This arrangement makes it possible for the tilt blade in the tool holder or the blade holder to be controlled for a deburring operation without significant wear phenomena. The lock connection is designed so that the deburring blade can be moved up and down resiliently within a certain area in particular for noncircular bore edges so that an extended working range results.

For controlling the tilt blade in the direction of rotation of the tilt blade, the bar spring meshes with the recess of the tilt blade or tool holder whereby resilient cutting properties of the tilt blade are reached in a certain area, without engaging the locking device during up and down movement especially when bore edges are non-circular, and without locking the tilt blade.

With a tappet guide, a tappet resilient in an axial direction engages the recess of the tilt blade or tool holder whereby in a certain range the tilt blade can cut in a resilient manner in the direction of the lock release without engaging the locking device.

The tappet-like mesh of the bar spring or of an axially resilient tappet or a resiliently supported ball in the recess of the tilt blade allows for a very simple controlling of the tilt movement, whereby only little wear takes place.

Instead of the tappet-like mesh in the recess of the tilt blade, other locking devices are possible, in particular a one-arm lever which is controlled from the outside and whose free end engages the recess like a locking device.

According to the invention the cutting blade is either designed as one piece whereby the recesses are arranged on a circular body of the cutting blade itself, or the cutting blade with blade holder features two pieces whereby the recess is arranged in the body of the blade holder.

According to the invention the cutting blade or blade holder is arranged within the principal body on a swing bolt so that considerable power in the direction of the cut can be transferred in connection with the guide of the cutting blade or blade holder.

For the purpose of clarity, only the use of a single deburring blade in the tool holder or blade holder is described in the following description. It falls under the protection of the present invention if one uses in the tool or blade holder two identical deburring blades across from one another.

Also under the protection of the present invention is when one or more deburring blades are present not only in one deburring plane (also called cutting plane) but also when several cutting or deburring planes located axially above one another are arranged in the tool or blade holder. In such case one or more deburring blades would be assigned for each deburring or cutting plane.

In other words, the essential characteristic of the present invention is the controlled deviation of the deburring blade in the tool or blade container over the simply designed tappet-like locking device.

In the non-operating or operating positions the deburring blade swings out from a lateral recess in the tool holder so that the front and rear cutting edges are in a cutting position.

The tool holder is now activated in a turning motion and the deburring blade strikes the bore edge to be deburred with its front cutting edge.

At this time it is important that the swinging movement of the deburring blade does not impede deburring but that the deburring blade is able to carry out a certain swinging angle range during the deburring operation against the force of the locking device in connection with resilient properties of the locking device. The tool or blade holder is maintained rotatable in its rotating axis whereby the deburring blade with the resilient locking device is maintained in the tool holder so that certain swing movements of the deburring blade such as in the angle range of ±10° are allowed in the tool holder during the deburring operation. This makes it possible to smooth bore unevenness at the bore edge of for example ±2 mm.

Naturally, significantly greater compensation tolerances are to be overcome when bores are large and deburring blades are equally large. In such case bore humps of ±4 mm for example can be compensated.

In other words, the locking device in accordance with the invention is designed so that it allows this swinging angle area but also so that it assigns the deburring blade such a locking pressure that the deburring blade does not deviate from deburring the bore edge in its cutting position.

It is essential that a so-called ball unit with associated slide is incorporated radially outward on the front and rear cutting edge of the cutting portion of the deburring blade. On further penetration of the deburring blade into the bore the cutting edge changes over into the slide. The result is no longer a deburring action but rather the support of the slide on the bore edge. In the process the counter pressure on the deburring blade becomes so great with constant feed of the tool holder that the locking device is engaged and that the deburring blade including the blade holder are swung into the tool holder in the opposite direction of the feed direction. As a result, the locking device reaches a curve portion of a cam at the recess where a relatively low counterpressure exists so that the deburring blade with its slide travels through the bore under low counterpressure.

As soon as the counterpressure on the slide ceases to exist when the deburring blade travels through the through-hole, i.e. when the deburring blade leaves the rear bore, the locking device snaps back and brings the deburring blade back into its swung-out working position. In this position the feed or the tool holder is reversed, the tool holder is axially displaced in its opposite direction, and as a result the rear cutting edge applies to the rear bore edge at the cutting portion of the deburring blade, and the blade can once again—using its swing angle range—even deburr uneven bore edges at the rear bore of the passage bore.

This makes it even possible to deburr bore edges whereby the front bore is designed as a plane bore and the rear bore as slanted bore whose plane forms an angle with the plane bore mentioned earlier. The swingable deburring blade evens out this slanted angle as well.

Similarly, instead of a slanted bore any bore edge featuring peaks and valleys can also be deburred.

Obviously, a similar use of the present invention makes it possible not only to deburr through-bores in this manner but also bore which are arranged as expanded bore in the area of a passage bore. Similarly, step bores for example can be deburred in a pipe.

Various executions of variants are possible as locking device for applying the corresponding deburring pressure to the deburring blades.

First, it is essential that the deburring blade or blade holder is maintained swingable on a swing bolt in the tool holder. The bolt does not necessarily have to lie in the axis of the tool holder but it can also be staggered with regard to the axis of rotation. The resulting advantages are described below.

According to the invention a spring-loaded locking device engages at the outside periphery of the deburring blade. The external periphery of the deburring blade is designed as cam in the area of the locking device; the locking device engages in the area of this cam. The locking device may have various variants.

In a first variant, the locking device is a simple spring swivel which is part of a straight spiral spring or bar spring whereby this spring swivel is preferably designed as a flat spring. With its front spring-loaded section this spring swivel engages the recess of the cam at the deburring blade.

Preferably the cam is designed so that in the deburring position of the deburring blade a strong counterpressure is brought to bear from the spring swivel to the deburring blade so that the deburring blade remains in its deburring position and the spring swivel only allows the swinging angle described earlier for evening out uneven bore edges.

However, when the pressure on the deburring blade becomes too high due to the introduction of the slide into the bore, the spring swivel leaves its mesh position on the cam and reaches another branch of the cam where a lesser counterpressure is brought to bear on the deburring blade. This lesser counterpressure is applied to the deburring blade during the passage through the through-hole.

Until now, we have described a simple spring swivel of a straight spiral spring as locking device. But it is also possible instead of this spring swivel to use a tappet which is axially springloaded and which engages the corresponding cam at the external periphery of the deburring blade whereby an even cam could be used on the deburring blade.

In a third variant the locking device is a spring-loaded ball which also engages a corresponding cam.

In another variant, the cutting blade including swivel body are not one part with the recess but cutting blade and blade holder are separate from on another.

According to the invention, the cutting blade is arranged in a transversal bore of a blade holder whereby the recess is at the external periphery of the blade holder.

In this variant the cutting blade can readily be removed from the tool whereby only the swing bolt is taken out of the basic body and the blade is pulled out of the bore of the blade holder.

Further variants and advantages of the invention are listed in the subclaims.

FIG. 5 shows the tool holder with built-in deburring blade in the direction of the arrow V in FIG. 6.

FIG. 6 is a lateral view of the tool holder with deburring blade in the direction of the arrow VI in FIG. 5.

FIG. 7 the engagement of a straight spiral spring in the cam of the deburring blade in enlarged representation.

FIG. 8 shows a cross-section of the deburring tool.

FIG. 9 shows the deburring tool consisting of the tool holder and deburring blade as well as the blade holder in the lateral view in cross-section, shown rotated 90° with regard to FIG. 8.

FIG. 10 cross-section along the line X—X in FIG. 8.

FIG. 11 shows the deburring blade in accordance with FIG. 8, also engaged for the machining of a larger bore diameter.

FIG. 12 shows a cross-section according to line XII—XII in FIG. 11.

Figure 13:
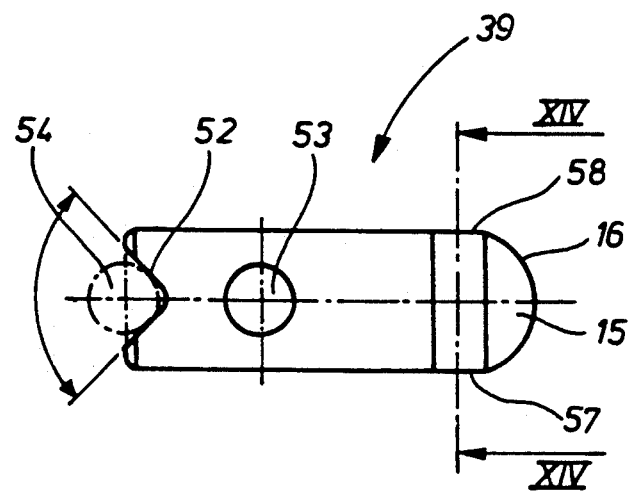

FIG. 13 shows a top view of the exchangeable blade.

Figure 14:
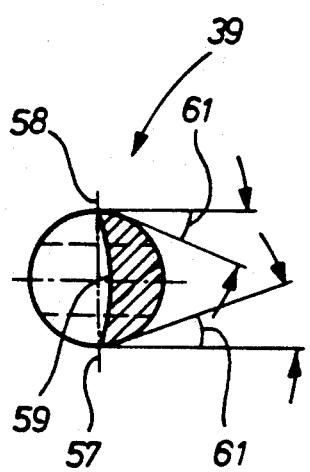

FIG. 14 shows a cross-section according to the line XIV—XIV in FIG. 13.

Figure 15:
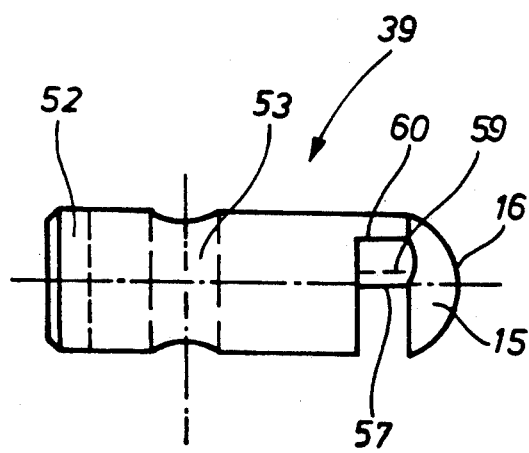

FIG. 15 shows the blade turned 90° with regard to FIG. 13.

Figure 16:
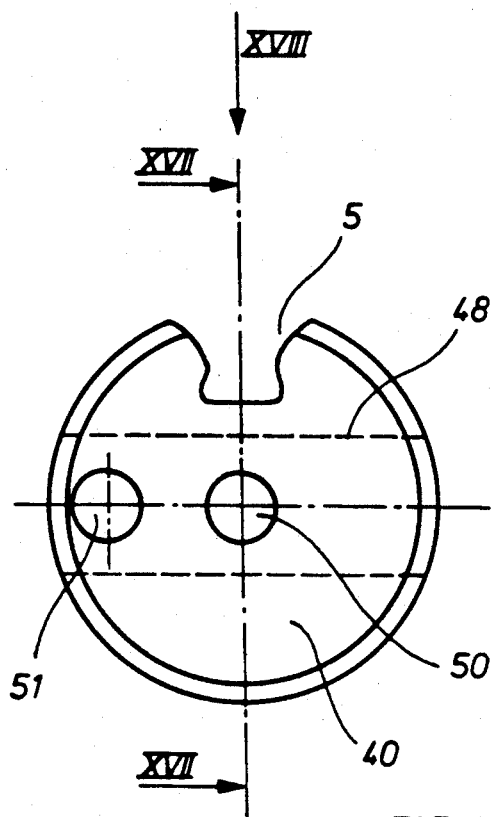

FIG. 16 shows a top view of the blade holder.

Figure 17:
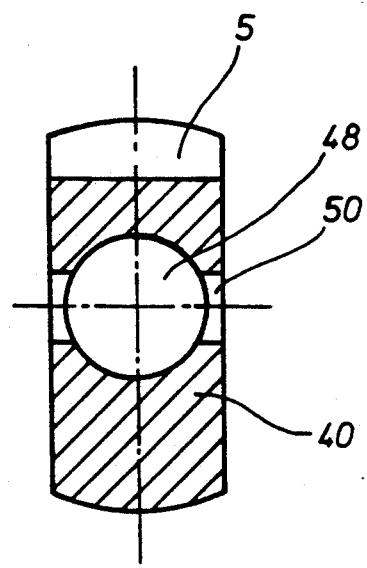

FIG. 17 shows a cross-section along the line XVII—XVII of FIG. 16.

Figure 18:
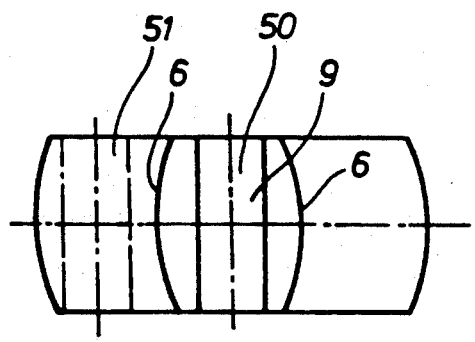

FIG. 18 top view of the blade holder according to FIG. 16 in the direction of the arrow XVIII.

Figure 19:
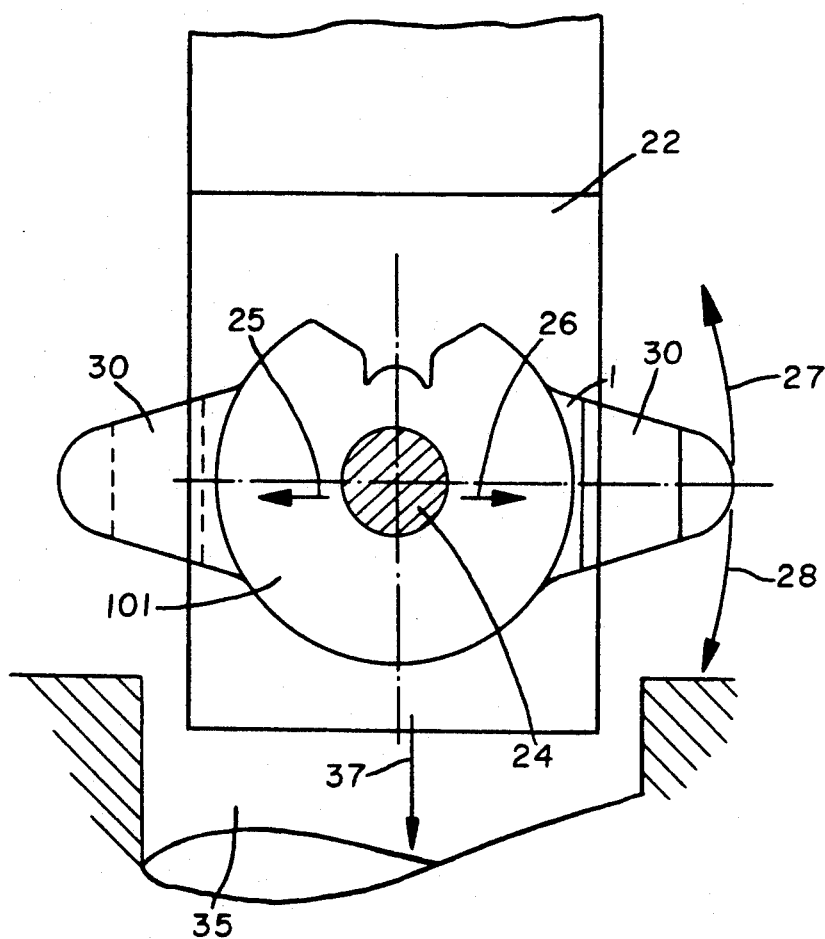

FIG. 19 is a view similar to FIG. 6 illustrating a tool holder with two identical deburring blades across from one another.

The rotatable deburring blade 1 is arranged in tool holder 2 in a slit-shaped recess 22 whereby the recess 22 features a lower opening 23.

Instead of the opening 23 the tool holder may also be closed at this point provided that the recess 22 is so large that the deburring blade 1 with its cutting portion 30 can swing in its entirety in the recess 22 in the direction of the arrows 27, 28 (compare FIG. 6).

To provide for the rotatable arrangement of the deburring blade 1 it features a bore 3 which is penetrated by a pin 24. The pin is fixed in lateral bores in the tool holder 2. The middle axis 4 of the tool holder 2 need not coincide necessarily with the middle axis of the bore 3.

According to the invention, the bore 3 with associated pin 24 can be staggered in the tool holder 2 in the direction of the arrows 25, 26 for the purpose of commencing the cutting phase.

The deburring blade 1 consists in essence of a flat body, which on one side changes over into a cutting portion 30 via edges 19, 20.

On its upper edge, the flat disk-like body features a recess 5 which has a cam 6 at its edge.

Figure 4:
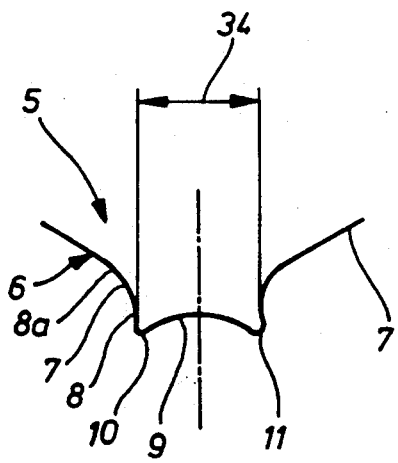
FIG. 4 is a amplified front view of the cam o the deburring blade.
Figure 3:
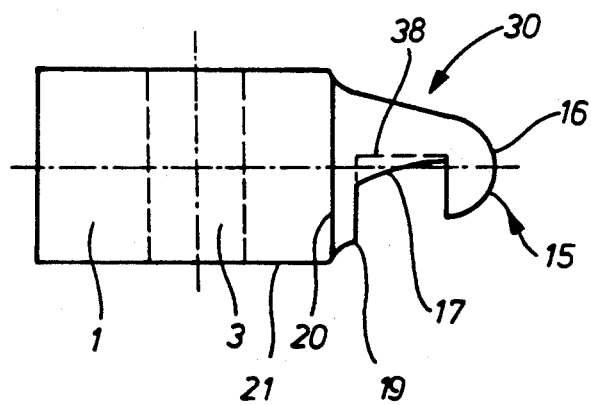
FIG. 3 is a top view of the deburring blade in the direction of the arrow III in FIG. 2.

The characteristics of the cam are described in greater detail by means of FIG. 4.

The cam consists of a middle radial curve 9 joined by exactly symmetrical curves 7 via edges 10, 11. Each curve 7 consists of a steep curve branch 8 and of a flatter curve branch 8a.

The curves 7 join the middle radius curve 9 mirror-symmetrically so that a distance 34 is created between both curves 7. As a result, the curves form a recess 5 which engages the locking device on the side of the tool holder. In accordance with the variant example of FIG. 1 the locking device consists of a spiral spring or bar spring 12 formed as flat spring and which engages the recess 5 with its free front end. In accordance with FIG. 7 this spiral spring is designated as a spring loaded rigid tappet 12a. It is important that a central point of support 33 is arranged on the radius curve 9 and that the lateral front edges of the spring tappet 12a feature a clearance 31, 32 to the lateral adjoining curves 7.

Figure 1:
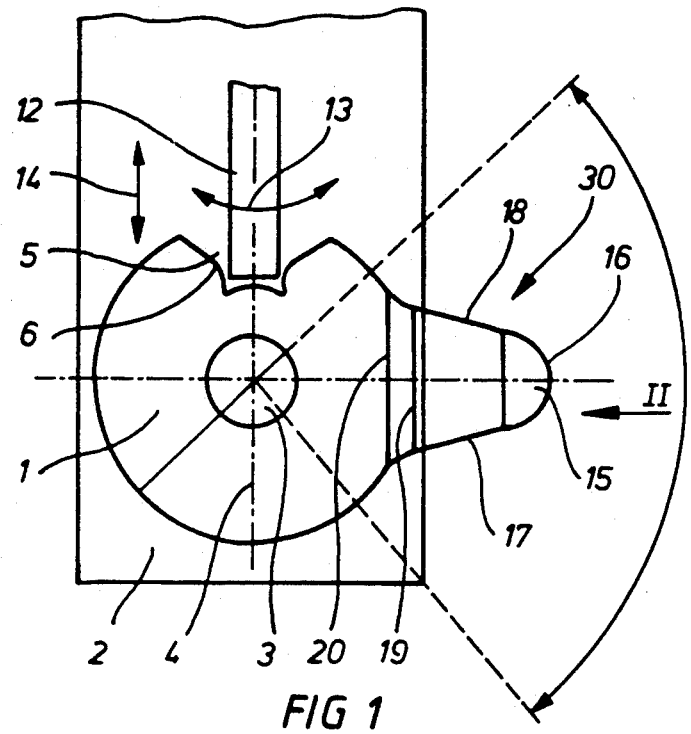
FIG. 1 shows a lateral view of a deburring blade in accordance with the invention whereby the tool holder is shown as a diagram.

This ensures a swing-free support of the tappet 12a or bar spring 12 in the recess 5 in accordance with FIGS. 1 and 8.

As a result, the bar spring 12 can rotate in the directions of the arrow 13 and engages in the recess 5 under the spring load of its spiral spring.

Earlier we already mentioned that instead of the formation of the tappet as a bar spring 12 a tappet arrangement can be used which is spring-loaded in the directions of the arrow 14 whereby a rigid tappet 12a engages the recess 5 spring-loaded in the directions of the arrow 14.

FIG. 1 illustrates the engagement of bar spring 12 in the recess 5 in the deburring position of the deburring blade, while FIG. 7 illustrates a similar position of the rigid tappet 12a. FIG. 7 shows that the tappet with its front edge is arranged at the middle point of support 33. In other words, when the deburring blade 1 penetrates a bore 35, the cutting edge 17 arranged on the front side of the cutting portion 30 strikes and deburrs the bore edge 36 even if the bore edge were to be non-circular and undulating.

In other words, it is important that based on the flexural properties of the bar spring 12 or based on the axial spring property of a tappet 12a in the direction of the arrow 14 a certain swing angle is allowed for the deburring blade 1 so that it sits tight with its cutting edge 17 on even a non-circular bore edge 36 and deburrs same under light rotation against the spring tension of the locking device.

In this regard the tappet 12a remains in the area of the central radius curve 9 in accordance with FIG. 7 whereby the lateral edges of the tappet overcome the tolerance 31, 32 and run up the steep curve branches 8 of the curve 7 and therefore prevent a further swinging of the deburring blade 1.

The angle which the cutting edge forms with the bore edge can be changed within relatively wide limits. Only a relatively small angle must be present as minimum requirement in order to guarantee a cutting action on the bore edge 36.

As soon as the deburring tool further penetrates the bore 35 in the direction of the arrow 37, the slide 16 arranged at the end of the cutting edge 17 strikes the bore edge 36 and thus terminates the cutting action.

With a further penetration of the deburring tool, the slide designed as ball 15 slides along the inside edge of the bore thus preventing any cutting action. Due to this counter pressure on the deburring blade the tappet 12 is now out of mesh with the lateral steep curve branches 8 of the curve 7 and reaches the flatter curve branches 8a which steadily connect with the steep curve branches 8 of curve 7.

When the curve branches 8a are flatter than the steeper curve branches 8, this results in a relatively smaller counterpressure on the deburring blade so that the slide can travel through the through-hole without damaging the bore inner edge. In other words, the ball 15 is now arranged on the inside of the bore.

As soon as bore is left on the other side, the bar spring 12 snaps back into the area of the recess 5 and as a result reaches once again the steeper curve branches 8 whereby the deburring blade regains its original position and the tool can be driven up in the opposite direction of the direction of the arrow 37 whereby the cutting edge 18 arranged at the rear end of the cutting portion deburrs the rear portion of the through-bore.

For the sake of completeness it must be pointed out that the cutting edges 17, 18 are arranged symmetrically to one another and change over into an edge 19.

The cutting edges 17, 18 are ground round in the radius thus resulting in a deeper groove 38 which serves as chip guide.

The cutting edges 17, 18 end radially inward in an edge 19, whereby the edge 19 in turn changes over into an edge 20 and whereby edge 20 changes over into the disk-shaped peripheral edge 21 of the deburring blade.

In accordance with FIG. 7 the tappet 12a is attached to a support 29 of the tool holder 2.

For its part, the support 29 is attached solid to the tool holder.

Figure 2:
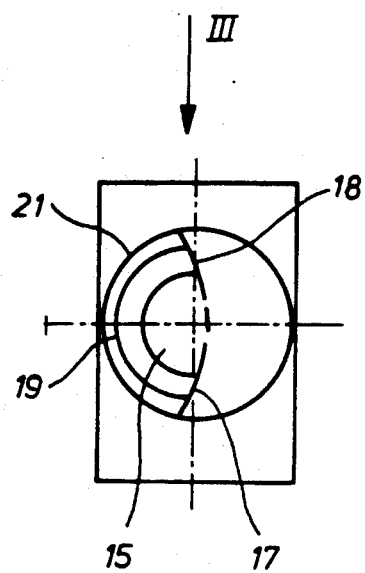
FIG. 2 is a top view of the deburring blade in accordance with FIG. 1 in the direction of the arrow II in FIG. 1.

In other words, the described deburring tool represents a very simple design whereby automatic deburring is guaranteed even in the event of uneven bore edges. With the described arrangement even small bore diameters down to bore diameters of about 2 mm can be deburred and upward to large bore diameters of unlimited diameter. Although only a single cutting blade is illustrated in the tool holder in FIGS. 1 and 2, two identical cutting blades 1,101 may be used in the tool holder as illustrated in FIG. 19. Each blade is identical to the blade 1 in FIGS. 1 and 6, and like reference numerals have been used where appropriate. The blades are both rotatably mounted via common pivot pin 24 but extend in opposite directions out of the mounting recess 22.

The tool holder may consist of synthetic material or metal while the deburring blade may be of synthetic material whereby cutting tips are used to replace the cutting edges.

In contrast to the variant in accordance with FIGS. 1 to 7, there is also a two-piece variant between the blade holder and the cutting blade in accordance with the variant of FIGS. 9 to 18.

The deburring blade 39 is exchangeable in the blade holder 40 whereby the blade holder has the same form with the locking recess as described in the previously described variants of FIG. 1 to 7.

The rotatable blade holder 40 is arranged in a recess in tool holder 2 and can be rotated around a swing bolt 41.

The swing bolt 41 is screwed in place in a bore 43 in the basic body 2 and is protected against axial shift by a screw 42 which runs perpendicular to it. The screw 42 is screwed in its own bore 44 whereby the bore 44 intersects with the bore 43. As a result, the bolt of the safety screw 42 is supported on the one front side of the swing bolt 41.

Obviously, instead of this arrangement of the swing bolt in connection with the bolt described here, another variant may be chosen. The swing bolt 41 can for example be designed as a spring cotter or as a simple screw which is screwed in place in a corresponding taphole 43.

The bar spring 12 is maintained in the basic body 2 through a spring holder 45 whereby the spring holder 45 is a socket-shaped part whose central bore accommodates the upper end of the bar spring 12. The bar spring 12 is clamped, soldered or glued in this bore.

The spring holder 45 features a revolving groove 46 in which meshes a safety screw 47. This ensures a unequivocal fixation of the spring holder 45 and therefore of the bar spring 12 in the basic body 2. Indeed, the axial length of the bar spring is of extreme significance in order to ensure the exact mesh of this bar spring 12 in the area of the recess 5 in the blade holder 40.

In other words, the spring holder 45 protects the entire bar spring 12 against axial shift in the basic body 2.

Important in the variant example is that the blade 39 is exchangeable and is arranged in a perpendicular bore 48 in the blade holder 40. The blade 39 is maintained in that the blade holder 40 features the bore 48 into which is introduced the cutting blade 39. For securing the position of the cutting blade 39 in the bore 48, a cross bore 50 is used which intersects with the larger bore 48 in accordance with FIG. 17. At the same time, the swing bolt 41 held in the bore 43 of the basic body 2 is introduced into the cross bore 50. This ensures that the blade 39 is maintained in the blade holder 40 through the single swing bolt 41 and that at the same time the swing bolt 41 forms the pivot bearing for the blade holder 40 in the basic body 2. In other words, this is a simple and inexpensive attachment.

This also ensures that the swing bolt 41 forms the pivot bearing for the blade holder 40 and at the same time serves to ensure the central arrangement of the blade 39. As a result the support of the blade 39 in the bore 48 in the blade container 40 is optimal, and the blade 39 is able to accommodate significant forces and transfer them to the blade container 40.

A further bore 51, arranged in radial distance from the bore 50, serves to assist in assembly, i.e. serves to facilitate the assembly of the blade 39.

Indeed, as shown in FIG. 13, the blade 39 features a prismatic recess 52 on its rear front side. To install the blade a safety pin 54 is first driven into the cross bore 51. The blade is then introduced into the bore 48 with its front side and prismatic recess 52 oriented towards the back, until the safety pin 54 with its outside periphery is flush and centered in the prismatic recess 52. At the same time, this ensures that the bore 53 in the blade 39 aligns with the bore 50 in the blade holder 40. Together with the blade holder the preinstalled blade is introduced into the basic body 2, the swing bolt 41 is then introduced into the aligned bores 43, 50 and 53, and secured with safety screw 42.

In other words, the arrangement of the safety pin 54 on the prismatic recess 52 serves to center the blade 39 in the blade holder 40 in order to bring the bores 43, 50 and 53 successively for driving in the swing bolt 41 in aligned opposition.

It must be added that the larger bore 48 is designed as throughbore for accommodating the deburring blade 39 because this is simple from a manufacturing point of view.

Another significant difference in the example variant of FIGS. 9 to 18 as compared to the variant described earlier in FIGS. 1 to 7 is the fact that the cutting part of the deburring blade 39 is also different.

The variant in FIG. 1 shows two slanted cutting edges 17, 18 across from one another while the variant in FIG. 13 shows straight cutting edges 57, 58 across from one another. Nothing has changed in the front-side design of the deburring blade 39, i.e. there is also a ball part 15 with slide 16 on the outer periphery whose function has already been described in the variant shown in FIGS. 1 to 7.

The arrangement of straight cutting edges 57, 58 parallel with one another offers the advantage that the engagement of the cutting edges on the work piece is more aggressive because in slanted cutting edges the tilt blade has a greater tendency to tilt, thus producing a tilt pressure, while in straight cutting edges 57, 58 arranged parallel to one another the corresponding tilt pressure is not as great as that in the variant described above. In other words, the blade in FIG. 13 is able to cut more aggressively without exercising an undesired great tilt pressure on the locking mechanism. In addition, the straight cutting edges are easier to machine from a manufacturing point of view than the slanted cutting edges 17, 18 described earlier.

Together with FIG. 15, FIG. 14 shows the form of the chip surface 59 and of the open space 60 behind it, which forms the clearance angle 61 in accordance with FIG. 14.

In addition, FIGS. 11 and 12 show that even a slightly tilted deburring blade 39 continues to be able to cut, as explained in greater detail in FIGS. 11 and 12.

Despite the tilt position of the deburring blade 39 in accordance with FIGS. 11 and 12, the cutting surfaces 57 and 58 engage the work piece.

But the variant in accordance with FIGS. 11 and 12 is different from the variant in FIGS. 8 to 10 in that the variant according to FIGS. 11 and 12 shows a modification. FIG. 8 shows a central bore for the swing bolt 41. This means that the engagement line of the bar spring 12 cuts exactly the middle line through the bore for the swing bolt 41.

However, the variant in accordance with FIGS. 11 and 12 shows an eccentric arrangement of the swing bolt 41 in terms of the engagement line of the bar spring 12.

This shows that the swing bolt 41 is moved forward from the central engagement line of the bar spring 12 by a distance 64, i.e. in the direction of the cutting edges 57, 58 of the deburring blade 39.

Within the context of the present invention, the blade holder 40 is eccentric to the cross center line of the basic body 2 and therefore eccentric and rotatable in the recess of the basic body 2.

This offers the significant advantage that when the entire blade holder is arranged eccentrically in the basic body, various bore diameters can be deburred depending on the variant.

For example, if one wishes to deburr a bore diameter of 13 mm, one selects an exactly central arrangement of the blade holder 40 in the basic body 2. But if one wants to deburr a bore diameter of 14 mm for example, one moves the swing bolt 41 together with its bore in the blade holder to the right by a distance 64 (0.5 mm) in order to deburr bore diameter of 14 mm for example. If one wants to deburr a bore diameter of for example 12 mm, one selects the distance 64 by half a millimeter to the left, i.e. the swing bolt 41 is arranged eccentrically to the left in the basic body 2. As a result, bore diameters of 12 mm can be deburred with the same blade.

This reduces significantly the need for spare parts because the blade holder 40 and deburring blade 39 can always be used the same. The basic body 2 can also be used the same with the exception of the arrangement of the bore 43 which, depending on the variant as described above—may be arranged in the basic body either central or moved to the front or rear.

I claim:

1. A deburring tool, comprising:
    an elongate tool holder rotatable about its longitudinal axis and having a mounting recess extending transverse to the longitudinal axis;
    at least one deburring blade in said mounting recess having an outer end projecting outwardly from said recess to one side of said tool holder;
    pivot means extending transverse to the recess and longitudinal axis for pivotally mounting said deburring blade in said recess to allow tilting of said outer end in opposite directions from a central deburring position to retracted positions;
    said deburring blade having a hemispherical, non-cutting surface at its outermost end and opposing cutting surfaces extending inwardly from said non-cutting surface; and
    biassing means for biassing said deburring blade to allow a limited degree of tilting about said central deburring position within a limited deburring range and provide a strong counter-pressure on said blade in any deburring position within said range, for allowing said blade to tilt inwardly beyond said deburring range when said counter-pressure is exceeded as said tool holder travels into a bore.

2. The tool as claimed in claim 1, wherein said pivot means is centered on the central longitudinal axis of said tool holder.

3. A deburring tool, comprising:
    an elongate tool holder rotatable about its longitudinal axis and having a transverse mounting recess;
    at least one deburring blade in said mounting recess having an outer end projecting out of said recess to one side of said tool holder;
    pivot means for pivotally mounting said blade in said recess for tilting movement in opposite directions from a central deburring position about a pivot axis transverse to the tool holder; and
    releasable limit means for allowing a limited amount of tilting in opposite directions from said central deburring position, said limit means including uniformly acting biassing means for providing a strong counter-pressure on said blade in any deburring position in said range, said counter-pressure varying uniformly with tilting of said blade in opposite directions from said central deburring position.

4. The tool as claimed in claim 3, wherein said deburring blade is in two parts, one part comprising a blade holder in said recess having a circular periphery and a through bore, and the other part comprising a blade member mounted in said through bore, said pivot means extending transversely through said through bore and blade member.

5. The tool as claimed in claim 3, wherein said deburring blade comprises a unitary elongate member having a first portion of circular cross-section inside said recess and a second portion projecting at least partially out of said recess in said central deburring position, said pivot means extending transversely through said first portion.

6. The tool as claimed in claim 3, wherein said deburring blade has opposite front and rear cutting edges.

7. The tool as claimed in claim 6, wherein said blade has a hemispherical, non-cutting surface at its outer end and said opposite cutting edges extend from said non-cutting surface.

8. The tool as claimed in claim 3, wherein two deburring blades are mounted in said recess to project in opposite directions from said recess, said pivot means comprising a common swing bolt extending transversely through both blades.

9. The tool as claimed in claim 3, wherein said limit means comprises a locking recess on the outer periphery of said deburring blade and biassing means mounted on said tool holder and projecting into said recess to engage in said locking recess.

10. The tool as claimed in claim 9, wherein said locking recess has a central curved seating area for said biassing means corresponding to the central deburring position of said blade, and opposite cam curves projecting outwardly from opposite sides of said central seating area, each cam curve being the mirror image of the opposite cam curve and comprising means for engaging said biassing means as said blade tilts in opposite directions from said central position.

11. The tool as claimed in claim 10, wherein each cam curve has a first steep curve branch extending from the respective outer edge of said seating area, and a flatter curve branch extending from said steep curve.

12. The tool as claimed in claim 9, wherein said biassing means comprises a bar spring engaging at one end in said locking recess.

13. The tool as claimed in claim 9, wherein said biassing means comprises a rigid tappet engaging at one end in said locking recess and spring-loaded in an axial direction into said locking recess.

14. The tool as claimed in claim 9, wherein said locking recess defines a cam surface and said biassing means engages in said recess with some free play in said central position for allowing a predetermined amount of limited swinging movement from said central position within a predetermined small swing angle range.

15. The tool as claimed in claim 3, wherein said pivot means comprises a swing bolt extending through said deburring blade, and a perpendicular screw engages transversely in said swing bolt to prevent axial shifting of said swing bolt.

16. The tool as claimed in claim 9, wherein said biasing means comprises a bar spring, a spring holder being mounted on said tool holder and projecting at one end from said tool holder into said tool holder recess to engage in said locking recess, said spring holder having an annular groove and a safety screw engaging in said annular groove.

17. The tool as claimed in claim 4, wherein said blade member comprises an elongate member extending from an inner end within said blade holder bore to an outer, cutting end projecting out of said blade holder bore, the inner end of said blade member having an indentation, and a safety pin projecting across said blade holder bore and engaging in said indentation.

18. The tool as claimed in claim 3, wherein said blade has oppositely directed, straight and parallel cutting edges.

19. The tool as claimed in claim 3, wherein said pivot axis is offset from the central longitudinal axis of said tool holder.

* * * * *

UNITED STATES PATENT AND TRADEMARK OFFICE
CERTIFICATE OF CORRECTION

PATENT NO. : 5,135,338
DATED : August 4, 1992
INVENTOR(S) : Heinrich Heule

It is certified that error appears in the above-identified patent and that said Letters Patent is hereby corrected as shown below:

Column 10, Line 48, change "opposite" to --opposing--.

Column 10, Line 51, change "opposite" to --opposing--.

Signed and Sealed this

Fifth Day of October, 1993

Attest:

BRUCE LEHMAN

Attesting Officer         Commissioner of Patents and Trademarks